USOO5714558A

United States Patent [19]
Groth et al.

[11] Patent Number: 5,714,558
[45] Date of Patent: Feb. 3, 1998

[54] PROCESS FOR PREPARING POLYASPARTIC ACID

[75] Inventors: Torsten Groth; Winfried Joentgen, both of Köln, Germany; Nikolaus Müller, Monheim, Germany

[73] Assignee: Bayer AG, Leverkusen, Germany

[21] Appl. No.: 525,430

[22] Filed: Sep. 7, 1995

Related U.S. Application Data

[63] Continuation-in-part of Ser. No. 197,695, Feb. 17, 1994.

[30] Foreign Application Priority Data

Mar. 2, 1993 [DE] Germany .................. 43 06 412.4

[51] Int. Cl.⁶ ..................................................... C08F 26/00
[52] U.S. Cl. ............................................................. 526/312
[58] Field of Search .................................................. 526/312

[56] References Cited

U.S. PATENT DOCUMENTS

| | | | |
|---|---|---|---|
| 3,846,380 | 11/1974 | Fujimoto et al. | 260/78 A |
| 4,590,260 | 5/1986 | Harada et al. | 528/328 |
| 4,696,981 | 9/1987 | Harada et al. | 525/328.2 |
| 4,839,461 | 6/1989 | Boehmke | 528/363 |
| 5,219,952 | 6/1993 | Koskan et al. | |
| 5,221,733 | 6/1993 | Koskan et al. | 528/363 |
| 5,268,437 | 12/1993 | Holy et al. | 526/312 |
| 5,288,783 | 2/1994 | Wood | |
| 5,296,578 | 3/1994 | Koskan et al. | |
| 5,393,868 | 2/1995 | Freeman et al. | 528/480 |

FOREIGN PATENT DOCUMENTS

| | | | |
|---|---|---|---|
| A-0578448 | 1/1994 | European Pat. Off. | |
| 46-8986 | 3/1971 | Japan | 526/312 |
| A-1404814 | 9/1975 | United Kingdom | |
| WO-A-9214753 | 9/1992 | WIPO | |

OTHER PUBLICATIONS

Dessaignes, *The Quarterly Journal of the Chemical Society of London*, vol. III, pp. 187 and 188, (1851), Translation of Compt. Rend. XXX 324.

Kovacs et al., Chemical Studies of Polyaspartic Acid, J. Org. Chem., vol. 26, pp. 1084–1091 (1961).

Orbit Abstract of DE-A-2 253 190 (5/10/73).

Harada et al., Polycondensation of Thermal Precursors of Aspartic Acid, J. Org. Chem., vol 24, pp. 1662–1666 (1959).

*Primary Examiner*—Joseph L. Schofer
*Assistant Examiner*—N. Sarofim
*Attorney, Agent, or Firm*—Connolly and Hutz

[57] ABSTRACT

Polyaspartic acid is prepared by polymerization of aspartic acid, maleic acid anhydride, maleic acid or fumaric acid in a solvent at from 130° C. to 300° C., optionally in the presence of ammonia.

23 Claims, No Drawings

PROCESS FOR PREPARING POLYASPARTIC ACID

CROSS-REFERENCE TO RELATED APPLICATION

The present application is a continuation-in-part of U.S. patent application Ser. No. 08/197,695, which was filed on Feb. 17, 1994, in the names of Groth et al.

The invention relates to a process for preparing polysuccinimide (PSI) and polyaspartic acid (PAA), salts thereof and the amide thereof by polymerization of aspartic acid, maleic anhydride, maleic acid or fumaric acid in a solvent at from 130° C. to 300° C., optionally in the presence of ammonia.

The preparation and use of polyaspartic acid (PAA) and derivatives thereof has long been the subject of numerous publications and patents. Thus the preparation can take place via thermal polycondensation of aspartic acid (J. Org. Chem. 26, 1084 (1961). U.S. Pat. No. 4,839,461 (=EP-A 0 256 366) describes the preparation of polyaspartic acid from maleic anhydride, water and ammonia. Maleic anhydride is converted into the monoammonium salt in aqueous medium by addition of concentrated ammonia solution. The monoammonium salt is melt-polymerized to polysuccinimide at temperatures from 125° C. to 140° C. and hydrolysed to PAA or a salt thereof. It is known from U.S. Pat. No. 4,590,260 (=JP-A 1984(59)-60160 that amino acids together with derivatives of malic, maleic and/or fumaric acid can be subjected to a polycondensation at from 100° C. to 225° C. According to U.S. Pat. No. 4,696,981 microwaves are used in such reactions.

DE-A 2 253 190 (=U.S. Pat. No. 3,846,380) describes a process for preparing polyamino acid derivatives, specifically polyaspartic acid derivatives. According to this patent, maleic acid derivatives (monoammonium salt and monoamide) are also used as well as aspartic acid in a thermal polymerization to prepare the intermediate polysuccinimide, which in turn can be reacted with amines in suitable solvents to give the desired derivatives.

Polyaspartic acid can, according to EP-A 256 365 (U.S. Pat. No. 4,839,461) and U.S. Pat. No. 5,116,513, be used for scale inhibition and scale deposit removal in water. Polyaspartic acid and salts thereof are active components of detergents and fertilizers, see U.S. Pat. No. 4,839,451 and EP-A-454 126.

From DE-A 2 029 502, a process is already known for preparing aspartic acid by rearrangement of the diammonium salt of maleic acid, in which process an aqueous solution of the diammonium salt is heated under pressure to temperatures from 110° C. to 145° C. A further process for preparing aspartic acid in aqueous solution is described in DD 126 075. However, the preparation of polyaspartic acid is not indicated in DE-A 2 029 502 and DD 126 075.

The invention relates to a process for preparing polysuccinimide and polyaspartic acid, salts thereof and the amide thereof, characterized in that aspartic acid, maleic anhydride, maleic acid or fumaric acid is treated at from 150° C. to 300° C. in a solvent, optionally in the presence of ammonia, with the residence time in a preferred embodiment being from 5 to 300 minutes and the polysuccinimide obtained optionally being converted into polyaspartic acid by hydrolysis.

The invention also relates to a process for preparing polysuccinimide and polyaspartic acid, salts thereof and the amide thereof, characterized in that aspartic acid, maleic anhydride, maleic acid or fumaric acid is treated at from 130° C. to 300° C., preferably from 150° C. to 300° C. in an organic solvent, selected from the group consisting of alcohols and organic, polar or aprotic solvents, optionally in the presence of ammonia, with the residence time in a preferred embodiment being from 5 to 300 minutes and the polysuccinimide obtained optionally being converted into polyaspartic acid by hydrolysis.

In the present invention polyaspartic acid is taken to mean both the free polyaspartic acid and also salts thereof.

The reaction can be carried out as a batch process or continuously. Of water is used as the solvent, the reaction mixture can be converted into the corresponding salt in the same solvent using a base.

Preferred alcohols for use as solvent are:

monofunctional primary, secondary and tertiary alcohols, e.g. methanol, ethanol, 1-propanol, 1-butanol, isopropanol, isobutanol, tert.-butanol and other tertiary $C_4$–$C_8$-alcohols;

diols and polyols, e.g. ethyleneglycol, propaneidol, butanediol, propanetriol;

polyetheralcohols with a molecular weight from 106–50000 e.g. diethylene glycol, triethyleneglycol and polyethyleneglycol.

Preferred polar aprotic solvents are:

N-substituted amides, e.g. N-methylforamide, N,N-dimethylformamide, N,N-dimethylacetamide, N,N-dicylcoalkylformamide, N-methylpyrrolidone and other N-alkylpyrrolidones, N,N-tetraalkylureas, e.g. N,N-tetramethylurea; ethers and polyethers, e.g. dioxane, ethyleneglycoldimethylether, diethyleneglycoldimethylether, triethyleneglycolidimethylether, polyethyleneglycoldimethylether and the corresponding ethylethers;

sulphur-containing polar aprotic solvents, e.g. dimethylsulphoxide, tetrahydrothiophene-1,1-dioxide (sulfolane) and carbonates, e.g. dimethylcarbonate and ethyleneglycolcarbonate.

The invention also provides a process for preparing polyaspartic acid and salts thereof.

When water is used as the solvent, the polymerization products can be converted into the corresponding salt of polyaspartic acid by dissolving in a base at from 20° to 95° C., preferably from 40° to 70° C., particularly preferably from 50° to 70° C.

Bases which can be used as, for example, alkali metal and alkaline earth metal hydroxides or carbonates, in particular NaOH, KOH, LiOH. The concentration of the base used is not critical, it is preferably from 5 to 50% by weight in the form of aqueous solutions. It is also possible to obtain the free polyaspartic acid at this early stage by hydrolysis in water at from 80° C. to 100° C. or by treatment of the salt with acids or acidic ion exchangers.

When an organic solvent is used, the polymerization products can be converted into the corresponding salt of polyaspartic acid by dissolving in a base at from 20° to 130° C., preferably from 40° to 105° C., particularly preferably from 50° to 70° C. Bases which can be used are, for example, alkali metal and alkaline earth metal hydroxides or carbonates, in particular NaOH, KOH, LiOH. The concentration of the base used is not critical, it is preferably from 5 to 50% by weight in the form of aqueous solutions. It is also possible to obtain the free polyaspartic acid at this early stage by hydrolysis in water at from 80° C. to 130° C., preferably from 80° C. to 100° C., or by treatment of the salt with acids or acidic ion exchangers.

The polysuccinimide prepared according to the invention contains, in a preferred embodiment, essentially recurring succinimide units having the following structure:

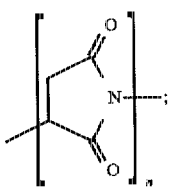

Additionally, by means of appropriate reaction procedure and choice of starting materials, further recurring units can be incorporated, for example a) aspartic acid units of the formula β form

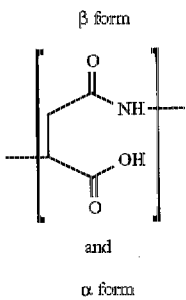

α form b) malic acid units of the formula

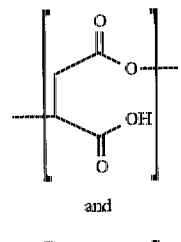

and

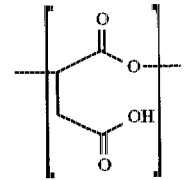

c) maleic acid and fumaric acid units of the formula

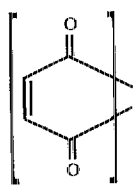

-continued
and

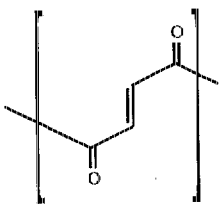

The polyaspartic acid prepared according to the invention contains, in a preferred embodiment, essentially the α and β units specified under a). In general at least 50%, in particular at least 70%, are present in the β form.

In addition to the recurring polyaspartic acid units, the recurring units specified under b) and c), for example, can be incorporated.

The recurring units b) and c) are preferably incorporated in an amount from 1:1 to 1:100, based on the total of a). In detail, the following amounts by weight of the recurring units are preferably incorporated:

a): from 50 to 99% by weight b): from 1 to 40% by weight c): from 0 to 10% by weight (particularly preferably from 1 to 10% by weight.

The analysis of the chemical structure is carried out preferably using $^{13}$C-NMR and, after total hydrolysis, using HPLC, GC and GC/MS.

In a preferred embodiment, the reaction is carried in water as solvent. In a particularly preferred embodiment, the starting materials, particularly maleic anhydride and ammonia, are reacted in water. The reaction is advantageously carried out at a temperature from 150° C. to 300° C., preferably from 180° C. to 250° C., particularly preferably from 180° C. to 220° C., and a molar ratio of maleic anhydride or maleic acid or fumaric acid of $NH_3$ from 1:0.8 to 1:1.2, preferably from 1:0.95 to 1:1.05. For preparing the polyaspartamide the molar ratio of substrate to ammonia is, in the case of maleic anhydride, maleic acid or fumaric acid, from 1:1.8 to 1:2.4, preferably from 1:1.9 to 1:2.2, and in the case of aspartic acid from 1:0.8 to 1:1.2, preferably from 1:0.95 to 1:1.05. When carrying out the reaction as a continuous process the residence time is, depending on the reaction temperature, from 5 minutes to 300 minutes. A further embodiment comprises carrying out the reaction in two temperature stages. Here, for example, maleic anhydride and $NH_3$ are reacted at from 20° C. to 100° C., particularly from 40° C. to 80° C., and subsequently heated for from 5 minutes to 300 minutes to from 150° C. to 300° C. After the reaction time is complete, the corresponding PAA salts can be prepared in the same reaction medium by addition of a base. The molar ratio of the water solvent to, for example, maleic anhydride is calculated so that a liquid reaction solution is ensured during the whole reaction. Part of the water is added at the beginning of the reaction; a further part of the water is added after the polymerization is complete and after the reaction mixture has cooled to from 60° C. to 100° C., either as pure water or, when preparing the PAA salts, in the form of an aqueous solution of base.

If the actual polymerization step carried out at elevated temperature is considered, then the molar ratio of maleic anhydride and water should here be 1:1–1:5, preferably 1:1.3–1:2.5.

In a particularly preferred embodiment, maleic anhydride and ammonia are reacted in alcohols and polar aprotic solvents. The reaction is advantageously carried out at a temperature from 130° C. to 300° C., preferably from 150° C. to 250° C., particularly preferably from 170° C. to 220° C., and a molar ratio of maleic anhydride or maleic acid or fumaric acid to $NH_3$ from 1:0.8 to 1:1.2, preferably from 1:0.95 to 1:1.05.

For preparing the polyaspartamide the molar ratio of substrate to ammonia is, in the case of maleic anhydride, maleic acid or fumaric acid, from 1:1.8 to 1:2.4, preferably from 1:1.9 to 1:2.2, preferably from 1:0.95 to 1:1.05. When carrying out the reaction as a continuous process the residence time is, depending on the reaction temperature, from 5 minutes to 300 minutes. A further embodiment comprises carrying out the reaction in two temperature stages. Here, for example, maleic anhydride and $NH_3$ are reacted at from 20° C. to 100° C., particularly from 40° C. to 80° C., and subsequently heated for from 5 minutes to 300 minutes to from 130° C. to 300° C. After the reaction time is complete, the corresponding PAA salts can be prepared a.) by evaporating the organic solvent and hydrolysing the otained polysuccinimide in aqueous NaOH or b.) by diluting the reaction mixture with water and filtering off the polysuccinimide which is hydrolysed in aqueous NaOH to yield polyaspartic acid sodium solution. The molar ratio of the organic solvent to, for example, maleic anhydride is calculated so that a liquid reaction solution or a reaction mixture with a low viscosity is ensured during the whole reaction.

If the actual polymerization step carried out at elevated temperature is considered, then the molar ratio of maleic anhydride and organic solvent should here by 1:1.5, preferably 1:1.3–1:2.5.

The reaction can be carried out under increased pressure. A maximum pressure corresponding to the critical pressure of ammonia (113 bar) can be reached here. However, the reaction is preferably carried out at a pressure of 2–70 bar, particularly preferably at 5–40 bar.

An advantage of the process of the invention is the circumvention of the viscous and solid phases which are unavoidable in bulk polymerisation and which can be dealt with only with great technical effort. When water is used as the solvent, a further advantage of the process of the present invention is that the process can be carried out without intermediate isolation.

The salts prepared according to this process (for example the sodium salt) exhibit properties of a dispersant and sequestering agent and of a corrosion inhibitor and can be employed correspondingly. In addition, an antimicrobial activity, i.e. against bacteria and fungi, can be seen.

The polymer prepared has, depending on the reaction conditions such as residence time and temperature of the thermal polymerization, different chain lengths or molecular weights according to analysis by gel permeation chromatography ($M_2$=from 500 to 10,000, preferably from 1,000 to 5,000, particularly preferably from 2,000 to 4,000).

The compounds according to the invention are used, in particular, as dispersants, detergent additives, sequestering agents, scale inhibitors, as corrosion inhibitors, particularly for brass, and as microbicides and in fertilizers.

EXAMPLE 1

An autoclave is charged with 245 g of maleic anhydride in 89 g of water and the mixture is heated to 60° C. 44.5 g of $NH_3$ are then pumped in. The mixture is subsequently heated to 200° C. over a period of 30 minutes and stirred for a further 30 minutes at this temperature. After cooling to 60° C., 167 g (1.25 mol) of 30% strength NaOH solution are added. After cooling to room temperature, a red solution is obtained. For complete conversion into the sodium salt, the solution is reacted at 60° C. with a further 140 g (1.05 mol) of 30% strength NaOH solution. The sodium polyaspartic obtained after spray drying has an aspartic acid content of 72% (HPLC after total hydrolysis) and shows good dispersing and sequestering properties.

EXAMPLE 2

An autoclave is charged with 245 g of maleic anhydride in 72 g of water and the mixture is heated to 80° C. 42.5 g of $NH_3$ are then pumped in. The mixture is subsequently heated to 170° C. over a period of 30 minutes and stirred for a further 120 minutes at this temperature. On cooling the solution remains liquid down to about 60° C., but on further cooling to room temperature it becomes solid. A further 100 g of water are therefore added at 80° C., so as to obtain a solution at room temperature. The solution of a polysuccinimide/polyaspartic acid mixture obtained in this way likewise shows, after conversion into the sodium salt, good dispersing and sequestering properties.

1. Sequestration of a surfactant

Assessment of the turbidity of a sodium alkylbenzenesulphonate solution in tap water. 1 ml of a 10% strength solution of an alkylbenezenesulphonate is admixed with 0.1 g of spray-dried sodium polyaspartate from Example 1 or 2 and made up to 100 ml with tap water (total degree of hardness 14.1). The solution obtained was stable on standing for over 7 days. Without addition of sodium polyaspartate the solution becomes turbid in a few minutes.

2. Dispersion of zinc oxide 0.3 g of sodium polyaspartate from Example 1 and 2 is dispersed in 200 ml of tap water together with 10 g of zinc oxide. The dispersion is transferred to a 250 ml measuring cylinder. After three hours, samples are taken from different positions in the measuring cylinder and analyzed for their zinc oxide content. It was found that the zinc oxide content is always the same as a result of the good dispersing action. Furthermore, the sedimentation stability is determined after 3 hours and after 24 hours. In both cases, practically no layer of sediment is found at the bottom of the measuring cylinder.

EXAMPLE 3

If methanol is to be used as the organic solvent in the process of the present invention, the following steps should be followed:

An autoclave is charged with 250 g of methanol and 35 g of ammonia. The mixture is heated to 70° C. and 196 g molten maleic anhydride is pumped in. The reaction mixture is heated under pressure at 160° C. for 1 hour and cooled to 50° C. The autoclave is opened and the reaction mixture is heated until all solvent is evaporated. 208 g of the remaining polysuccinimide are dissolved in 480 g of 20% aqueous solution hydroxide solution. Water is added and aqueous ammonia is distilled off at 100°–105° C. as long as it develops. This process would produce about 700 g of a 30% polyaspartic acid sodium salt solution that would have good dispersing and sequestering properties.

EXAMPLE 4

If tert.-butanol is to be used as organic solvent in the process of the present invention, the following step should be followed: An autoclave is charged 160 g tert.-butanol and 31 g of $NH_3$. The mixture is heated to 70° C. and 160 g of molten maleic anhydride is pumped in. The reaction mixture is heated under pressure at 190° C. for 1 hour and cooled to 60° C. The reaction product (139 g) is filtered off and hydrolyzed with 250 g 20% aqueous sodium hydroxyde solution. Water is added and aqueous ammonia is distilled off at 100°–105° C. as long as it develops. This process would produce about 450 g of polyaspartic acid sodium salt solution (content of about 38% by carbon analysis) that would have dispersing and sequestering properties.

EXAMPLE 5

If N-methylpyrrolidone is to be used as organic solvent in the process of the present invention, the following steps should be followed: 75 g N-methylpyrrolidone and 18 g maleic anhydride we mixed in a reaction flask. The mixture is heated to 50° C. and 21 g ammonia are added so that the temperature does not exceed 80° C. After the addition of ammonia is complete, the temperature is raised up to 150° C. for 1 hour. After cooling to room temperature, the reaction mixture is diluted with 700 g of water. Polysuccinimide is filtered off and washed with additional water. After drying 50 g of polysuccinimide are hydrolysed with 95 g 20% aqueous sodium hydroxyde solution. Aqueous ammonium hydroxyde is distilled off at 100°–105° C. After addition of water, this process would produce about 200 g of polyaspartic acid sodium salt solution (content of about 33% based on carbon analysis) that would have dispersing and sequestering properties.

EXAMPLE 6

If dimethylsulfoxide is to be used as organic solvent in the process of the present invention, the following step should be followed: 196 g maleic anhydride are dissolved in 120 g dimethylsulfoxide at 70° C. 39 g of ammonia are added so that the temperature does not exceed 90° C. After the addition is complete the reaction mixture is raised to 170° C. for 0.5 h, cooled down to 70° C. and poured into water. Polysuccinimide is filtered off from the obtained suspension. After drying, 120° C. polysuccinimide are dissolved in 230 g 20% aqueous sodium hydroxyde solution and aqueous ammonia are distilled off until the distillation is complete. After addition of water, this process would produce about 300 g of polyaspartic acid sodium salt solution (content of about 50% based on carbon analysis) that would have dispersing and sequestering properties.

EXAMPLE 7

If polyethyleneglycol (carbowax 300) is to be used as organic solvent in the process of the present invention, the following step should be followed: 196 g maleic anhydride are dissolved in 150 g polyethyleneglycol (carbowax 300) at 80° C. 35 g of ammonia are added under cooling so that the temperature does not exceed 90° C. After the addition is complete the reaction mixture is heated to 175° C. for 1.5 hours. During this time the reaction water is evaporating. After cooling down the temperature to 70° C., the reaction mixture is diluted with water, polysuccinimide is filtered off and dried. 145 g polysuccinimide are dissolved in 275 g 20% aqueous sodium hydroxide solution and aqueous ammonia is distilled off at 100°–105° C. After dilution with water, this process would produce about 600 g of polyaspartic acid sodium slat solution (content of about 30% based on carbon analysis) that would have dispersing and sequestering properties.

To test the the compounds according to examples 3–7, the following steps should be followed:
1. Assessment of the turbidity of a sodium alkylbenzenesulphonate solution in tap water. 1 ml of a 10% strength solution of an alkylbenzenesulphonate is admixed with 0.3 g–1.0 g of sodium polyaspartate solution from Examples 3 to 7 and made up to 100 ml with tap water (total degree of hardness 14.1).
2. Dispersion of zinc oxide 0.3 g–1.5 g of sodium polyaspartate solution from Examples 3 to 7 is dispersed in 200 ml of tap water together with 10 g of zinc oxide. The dispersion is transferred to a 250 ml measuring cylinder. After three hours, samples are taken from different positions in the measuring cylinder and analysed for their zinc oxide content.

EXAMPLE 8

Polymerization in the presence of an alcohol (isopropanole)

An autoclave was charged with a mixture of 240 g isopropanole and 46.8 g of $NH_3$. The mixture was heated to 70° C. 245 g of molten maleic anhydride were then pumped in. The mixture was subsequently heated to 190° C. over a period of 30 minutes and stirred for a further 60 minutes at this temperature on cooling the mixture remains fluid down to about 60° C. but on further cooling to room temperature it became solid.

200 g of a 20% aqueous sodium hydroxide solution were therefore added at 80° C., so as to obtain a solution at room temperature. The solution of a polysuccinimide/polyaspartic acid sodium salt mixture obtained in this way likewise shows, after conversion into the complete sodium salt, good dispersing and sequestering properties.

The aspartic acid content of the dried sodium polyaspartate was 62% (HPLC after total hydrolysis of the polymer).

It has been shown that it is possible to polymerize maleic anhydride and ammonia in the presence of an alcohol.

EXAMPLE 9

Polymerisation in the presence of N-methylpyrrolidone 100 g of aspartic acid were added to 300 ml of N-methylpyrrolidone. The suspension of aspartic acid in N-methylpyrrolidone was heated and the temperature raised by steps up to 190° C.–200° C. During the heating the suspended aspartic acid crystals slowly dissolved and the color of the solution turned from colorless to orange and further to dark red. After four hours of heating the reaction was completed and the solution was cooled to room temperature. The precipitation of polysuccinimide was achieved by adding octanol to the reactions mixture. The obtained polysuccinimide was filtered and dried. It was characterized by $^{13}$C-NMR and elementary analysis. After transformation into the corresponding polyaspartic acid sodium salt the molecular weight distribution was found to be about 2900 dn, a weight basis according to GPC.

We claim:
1. Process for preparing polysuccinimide acid polyaspartic acid, salts thereof and the amide thereof by polymerization of maleic anhydride, maleic acid or fumaric acid at from 130° C. to 300° C. in a solvent selected from the group consisting of alcohols or organic polar aprotic solvents, in the present of ammonia, and optional hydrolysis of the polysuccinimide obtained to polyaspartic acid or a salt thereof.

2. Process according to claim 1 wherein the polymerization is carried out with a residence time from 5 to 300 minutes.

3. Process according to claim 1 wherein in the preparation of polyaspartic acid the molar ratio of maleic anhydride, maleic acid or fumaric acid to ammonia is between 1:0.8 to 1:1.2.

4. Process according to claim 1 wherein in the preparation of polyaspartamide the molar ratio to ammonia is, in the case of maleic anhydride, maleic acid or fumaric acid, between 1:1.8 and 1:1.4.

5. Process according to claim 1 wherein the reaction is carried out at a pressure from 2 to 70 bar.

6. Process according to claim 1 wherein the reaction is carried out at from 150° C. to 220° C.

7. Process according to claim 1 wherein the reaction is carried out continuously.

8. Process according to claim 1 wherein based are added prior to or after the polymerization.

9. Process according to claim 8 wherein the bases used are alkali meal or alkaline earth metal hydroxides or carbonates.

10. Process according to claim 1, wherein the solvent is selected from the group consisting of methanol, tert.-butanol, N-methylpyrrolidone, dimethylsulfoxide, polyethyleneglycol and isopropanol.

11. Process for preparing polysuccinimide and polyaspartic acid, salts thereof and the amide thereof by polymerization of maleic anhydride, maleic acid or fumaric acid at from 150° C. to 300° C. in water as solvent, in the present of ammonia, and optional hydrolysis of the polysuccinimide obtained to polyaspartic acid or a salt thereof.

12. Process according to claim 11, wherein the polymerization is carried out with a residence time of from 5 to 300 minutes.

13. Process according to claim 11, wherein in the preparation of polyaspartic acid the molar ratio of maleic anhydride, maleic acid or fumaric acid to ammonia is between 1:0.8 to 1:1.2.

14. Process according to claim 11, wherein the preparation of the polyaspartamide the molar ratio to ammonia is, in the case of maleic anhydride, maleic acid or fumaric acid, between 1:1.8 and 1:2.4.

15. Process according to claim 11, wherein the reaction is carried out at a pressure from 2 to 70 bar.

16. Process according to claim 11, wherein the reaction is carried out at from 180° C. to 220° C.

17. Process according to claim 11, wherein the reaction is carried out continuously.

18. Process according to claim 11, wherein bases are added prior to or after the polymerization.

19. Process according to claim 18, wherein the bases used are alkali metal or alkaline earth metal hydroxides or carbonates.

20. Process for preparing polysuccinimide and polyaspartic acid, salts thereof and the amide thereof by polymerization of aspartic acid at from 130° C. to 300° C. in a solvent selected from the group consisting of alcohols or organic polar aprotic solvents and optional hydrolysis of the polysuccinimide obtained to polyaspartic acid or a salt thereof.

21. Process for preparing polysuccinimide and polyaspartic acid, salts thereof and the amide thereof by polymerization of aspartic acid at from 150° C. to 3002 C. in water as solvent and optional hydrolysis of the polysuccinimide obtained to polyaspartic acid or a salt thereof.

22. Process according to claim 20, wherein in the preparation of polyaspartamide the molar ratio of ammonia to aspartic acid is between 1:0.8 and 1:1.2.

23. Process according to claim 21, wherein in the preparation of polyaspartamide the molar ratio of ammonia to aspartic acid is between 1:0.8 and 1:1.2

* * * * *

UNITED STATES PATENT AND TRADEMARK OFFICE
CERTIFICATE OF CORRECTION

PATENT NO. : 5,714,558
DATED : February 3, 1998
INVENTOR(S) : Groth et al.

It is certified that error appears in the above-identified patent and that said Letters Patent is hereby corrected as shown below:

In column 8, in line 53 (claim 1), "acid" should be --and--.
In column 9, in line 14 (claim 9), "meal" should be --metal--.
In column 9, in line 22 (claim 11), "present" should be --presence--.
In column 10, in line 23 (claim 21), "3002 C" should be --300°C--.

Signed and Sealed this

Tenth Day of October, 2000

Attest:

Attesting Officer

Q. TODD DICKINSON
Director of Patents and Trademarks